(12) United States Patent
Isken, II et al.

(10) Patent No.: US 7,695,392 B2
(45) Date of Patent: Apr. 13, 2010

(54) DIFFERENTIAL MECHANISM ASSEMBLY

(75) Inventors: Dennis W. Isken, II, Frankenmuth, MI (US); James M. Story, Saline, MI (US); Charles Krysztof, Canton, MI (US); Robert J. Neal, Commerce, MI (US); Jason Savage, Warren, MI (US); Gerald S. Szczepanski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 11/827,113

(22) Filed: Jul. 10, 2007

(65) Prior Publication Data

US 2009/0017962 A1 Jan. 15, 2009

(51) Int. Cl.
*F16H 48/06* (2006.01)
*F16H 57/02* (2006.01)
(52) U.S. Cl. ...................................... 475/230; 74/606 R
(58) Field of Classification Search ................... 475/220, 475/230, 331; 74/606 R
See application file for complete search history.

(56) References Cited

U.S. PATENT DOCUMENTS

| | | | |
|---|---|---|---|
| 4,722,244 A | | 2/1988 | Tsuchiya et al. |
| 4,959,043 A | * | 9/1990 | Klotz et al. ................. 475/230 |
| 5,545,102 A | * | 8/1996 | Burgman et al. ............ 475/230 |
| 5,791,205 A | * | 8/1998 | Ruppert, Jr. ................ 74/606 R |
| 6,254,505 B1 | * | 7/2001 | Forrest ........................ 475/230 |
| 6,394,927 B1 | * | 5/2002 | Bongard ..................... 475/231 |
| 6,616,565 B1 | | 9/2003 | Chen et al. |
| 6,623,396 B2 | * | 9/2003 | Szalony et al. .............. 475/230 |
| 6,945,898 B2 | * | 9/2005 | Szuba ......................... 475/230 |
| 6,981,929 B2 | * | 1/2006 | Janiszewski et al. ........ 475/230 |
| 7,081,065 B2 | * | 7/2006 | Sudou ......................... 475/230 |
| 7,155,997 B2 | * | 1/2007 | Santelli ....................... 74/607 |
| 7,591,751 B2 | * | 9/2009 | Sudorowski et al. ........ 475/230 |
| 2005/0049104 A1 | * | 3/2005 | Atkinson et al. ............ 475/230 |
| 2009/0013533 A1 | * | 1/2009 | Isken et al. ................ 29/893.1 |

FOREIGN PATENT DOCUMENTS

| | | |
|---|---|---|
| JP | 2000266162 | 9/2000 |
| WO | WO0023731 | 4/2000 |
| WO | WO03067122 A2 | 8/2003 |
| WO | WO2005026576 A2 | 3/2005 |

\* cited by examiner

*Primary Examiner*—Roger Pang
(74) *Attorney, Agent, or Firm*—David B. Kelley; MacMillan, Sobanski & Todd, LLC

(57) ABSTRACT

A differential assembly includes a first case portion, a second case portion secured to the first case portion, the first case portion and the second case portions enclosing a cavity and supported for rotation about a first axis, a spider pin located within and extending beyond the cavity at an axial position to engage the ring gear and secured to at least one of the first case portion and the second case portion for rotation therewith, and a ring gear secured to at least one of the first case portion and the second case portion, located radially outboard of the spider pins and at the axial position of the spider pins.

15 Claims, 16 Drawing Sheets

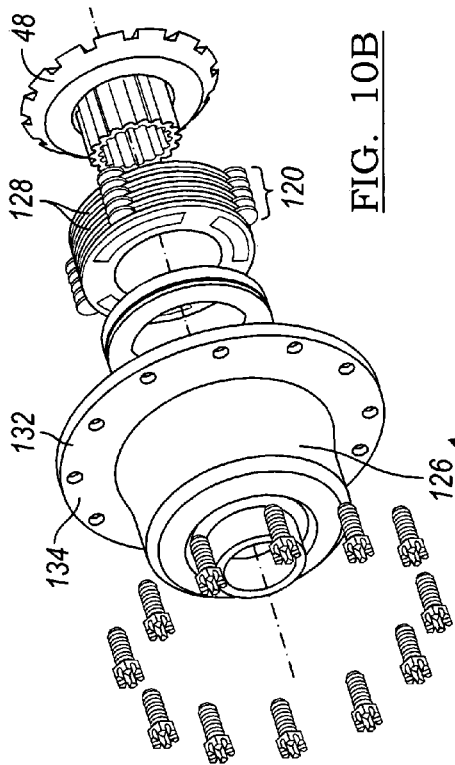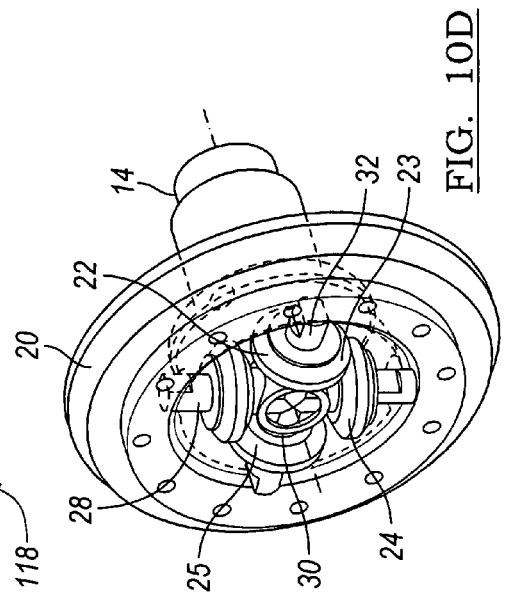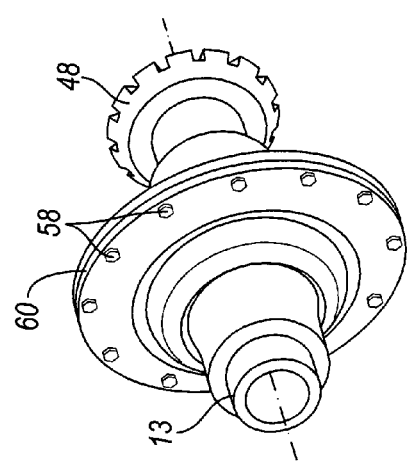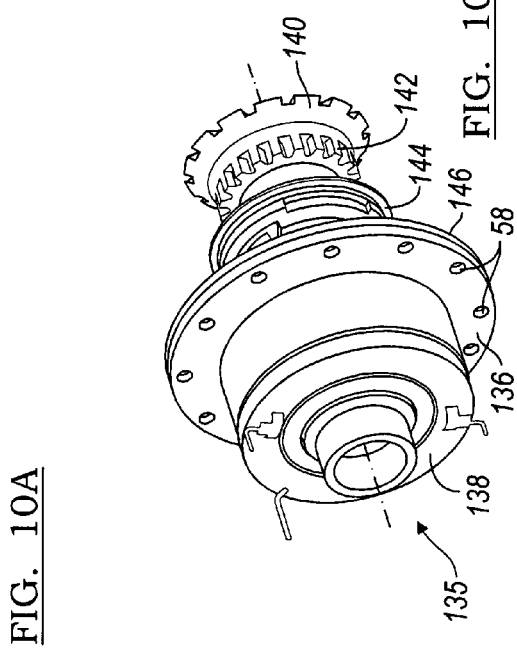

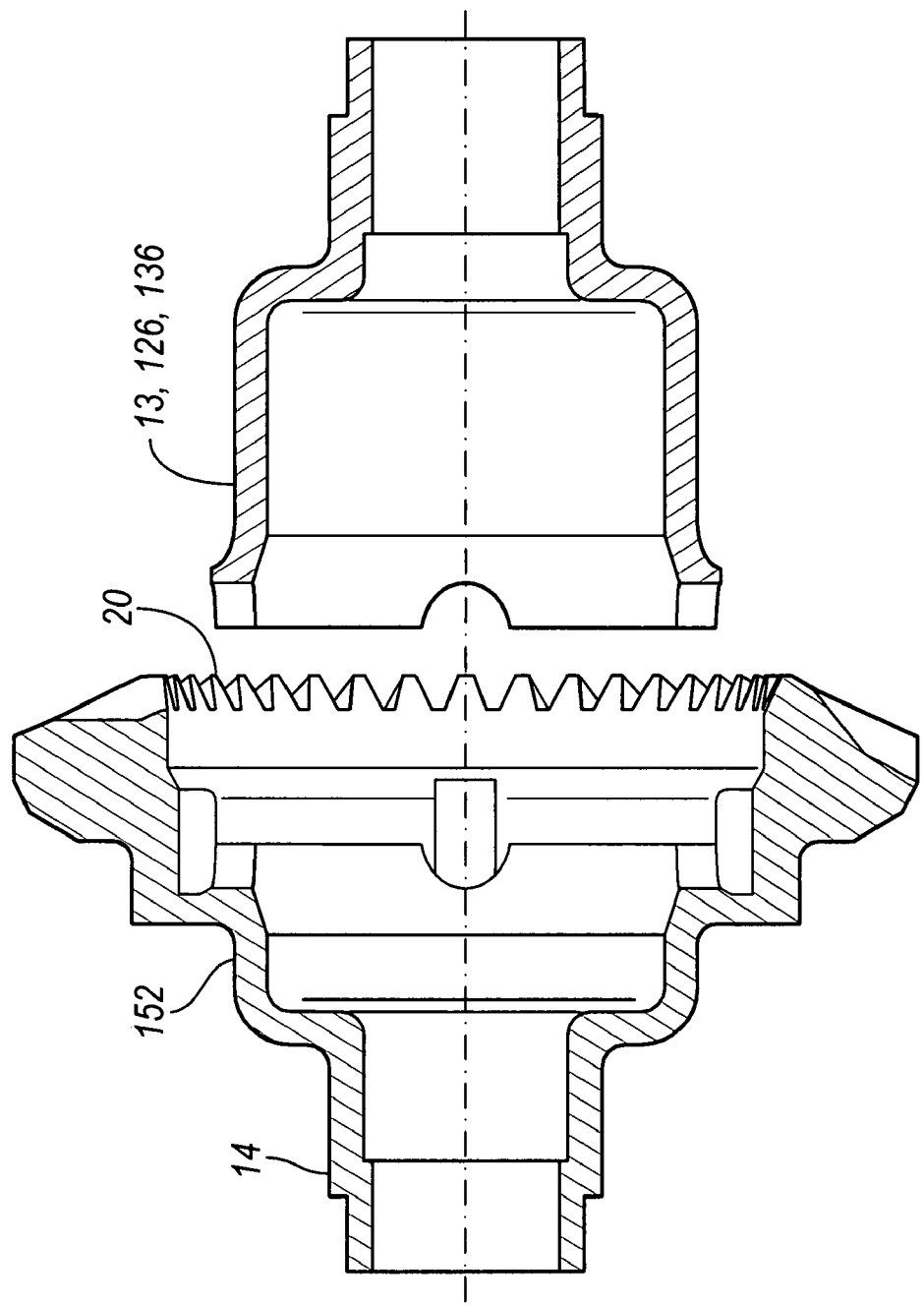

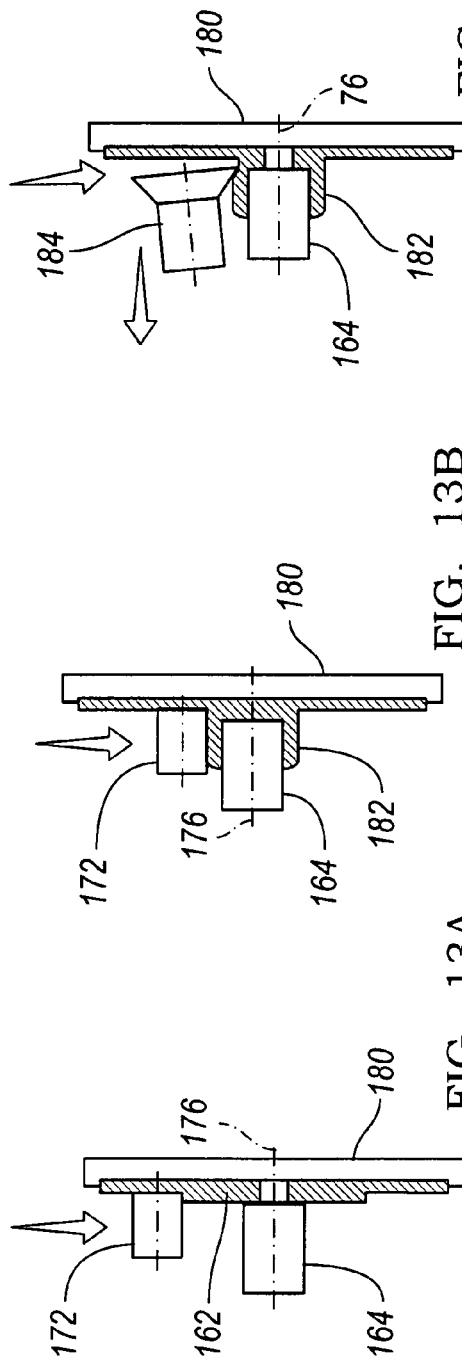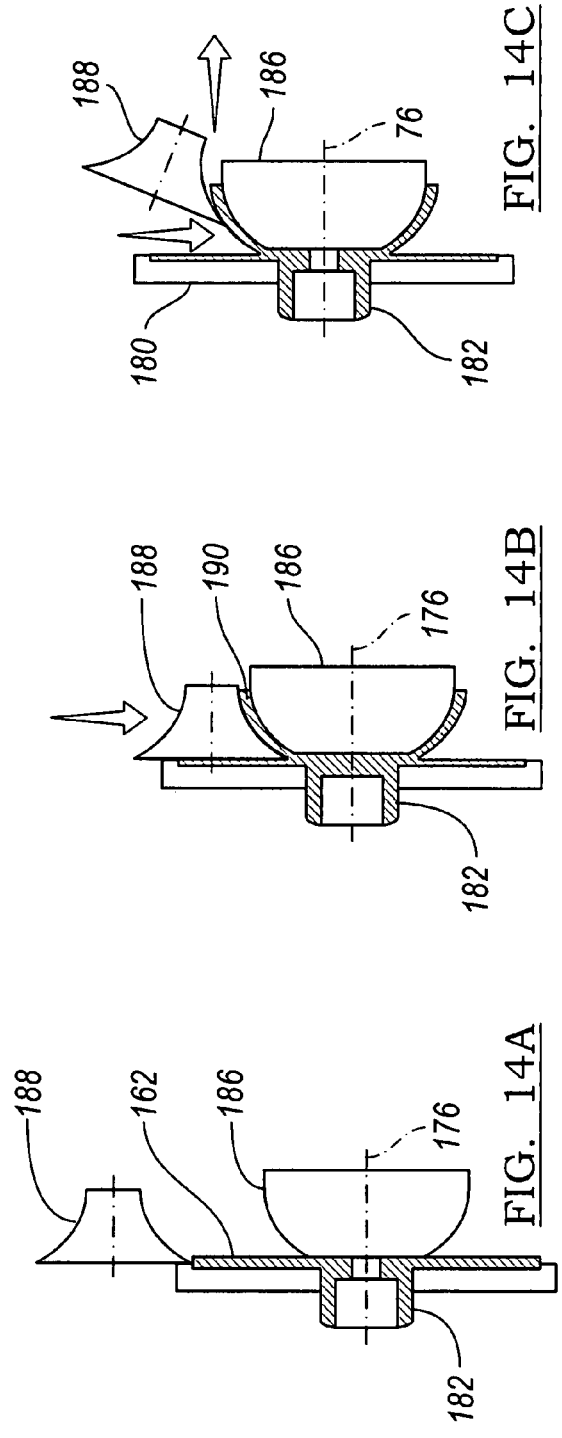

DIFFERENTIAL MECHANISM ASSEMBLY

BACKGROUND OF THE INVENTION

1. Field of the Invention

This invention relates generally to a differential gear mechanism for transmitting rotary power from a power source to the wheels of a vehicle so that the wheels can rotate at mutually differential speeds.

2. Description of the Prior Art

A differential mechanism transmits rotary power differentially to output shafts from a ring gear driven by an external power source, such as an internal combustion engine or electric motor. The differential ring gear, usually a hypoid bevel gear, is secured to the differential case, which is generally produced of cast nodular or ductile iron for high torque applications. The case is secured to the ring gear and defines a chamber containing bevel pinions driveably connected to the case by pinion shaft or spider, depending on the number of bevel pinions used, a right-side bevel gear and a left-side bevel gear in continuous meshing engagement with the bevel pinions. To support the bevel pinions, the case has equally spaced holes, equal in number to the number of bevel pinions used and positioned such that the pinion shaft or spider legs pass through the bevel pinions and through the holes in a proper spatial relationship, allowing proper meshing of the bevel pinion and bevel side gears, enabling torque transfer from the differential ring gear to the differential case to the pinion shaft to the bevel pinion gears, the bevel side gears, and right-side and left-side output shaft.

Each shaft is driveably connected to a wheel of the vehicle. These shafts pass coaxially through openings in the case called hubs, which are supported circumferentially by bearings pressed into the differential carrier, supporting, the entire differential assembly. Conventionally, the wall of the case is thick in the area where the pinion shaft or spider passes through the aforementioned holes, providing contact area sufficient to transmit the torsional load from the ring gear to the differential pin. It is preferable that there be no yielding of the case wall or the pinion shaft or spider in this area.

The inside surface of the one-piece cast differential case must be machined to tight tolerances. To accomplish this, complicated tools are inserted axially through a hub and radially through the windows. When the case or tool is rotated, this tool must be able to compensate for the different rotational radii required at different locations in the case, and this tool, or another tool, must be able to generate pockets where the pinion gears seat and in which they rotate with a hemispherical or flat-bottomed shape to match the back of the type of pinion gears used. Depending on the tolerances of the casting, particularly concentricity about its rotational axis and uniformity in wall thickness, some cases may need to be machined on the outside after the axis of rotation has been uniquely defined by the inside machining to achieve rotational balance.

Windows are cast into the one-piece case, which allows the pinion and side gears to be inserted for assembly. This is a manual operation requiring considerable dexterity.

Variations in the types of differential mechanisms, which include open, limited slip, and positive locking, require variations in the components that comprise the differential assembly. These variations have heretofore required that the case take different forms in order to accommodate the various components for each of applications.

There is a need in the industry, therefore, to improve the strength and stiffness of a differential assembly, to increase its torque capacity, to minimize its package space and to reduce the number of components that are unique to a particular application of the differential assembly, while minimally increasing or reducing total cost, including material and manufacturing cost. It is also desirable that weight is minimized and that NVH (noise, vibration and harshness) level be minimized.

SUMMARY OF THE INVENTION

A differential assembly includes a first case portion, a second case portion secured to the first case portion, the first case portion and the second case portions enclosing a cavity and supported for rotation about a first axis, a pinion shaft or spider pins located within and extending beyond the cavity to engage the ring gear at an axial position and contacting at least one of the first case portion and the second case portion for rotation therewith, and a ring gear secured to at least one of the first case portion and the second case portion, located radially outboard of the spider pins and at the axial position of the pinion shaft or spider pins.

The differential assembly eliminates torque flow through the differential case by transmitting torque from the differential ring gear via the pinion shaft or spider directly to the bevel pinion or differential gears. This direct drive eliminates the thick walls needed in a conventional differential case to house the differential pin and spider subassembly.

Because the case is split in two portions, one half of the case, differential shaft, differential pinion gears, and one differential side gear are common for all variations, such as open, limited slip, and positive locking. A preferred method of attaching this case to the hypoid bevel gear is by welding, although mechanical fasteners can be used.

The differential assembly eliminates elongation of the differential pinion shaft hole in the case under repeated loading, eliminates differential pinion shaft fasteners, reduces differential case wall thickness, while increasing stiffness, and maximizes torque capacity in a smaller package.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 10A is a perspective view of a differential case portion containing components of an open differential;

FIG. 10B is a perspective view of a differential case portion containing components of a limit slip differential;

FIG. 10C is a perspective view of a differential case portion containing components of an electromagnetically actuated locking differential;

FIG. 10D is a perspective view of a differential case portion containing components for use with any of the assemblies of FIGS. 10A-10C;

FIG. 11 is a side cross section of a machined forging that integrates the ring gear and common differential case portion;

FIGS. 13A, 13B and 13C illustrate process steps for form forming a first axial side of a differential case portion;

FIGS. 14A, 14B and 14C illustrate process steps for form forming a second axial side of the differential case portion;

DESCRIPTION OF THE PREFERRED EMBODIMENT

Figure 1:
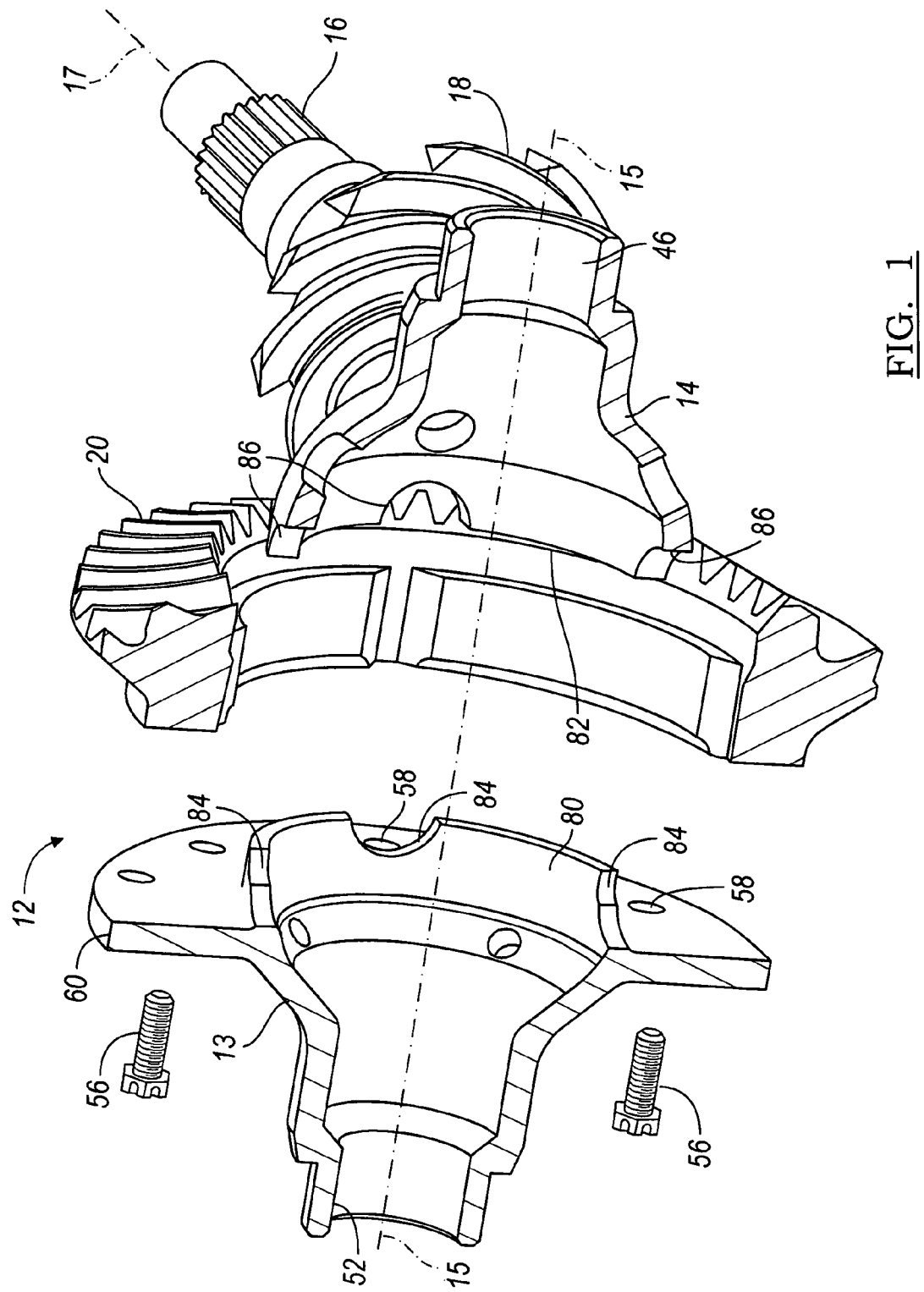
FIG. 1 is a perspective cross sectional view of a ring gear and welded differential case formed in portions, shown separated and axially spaced.
Figure 2:
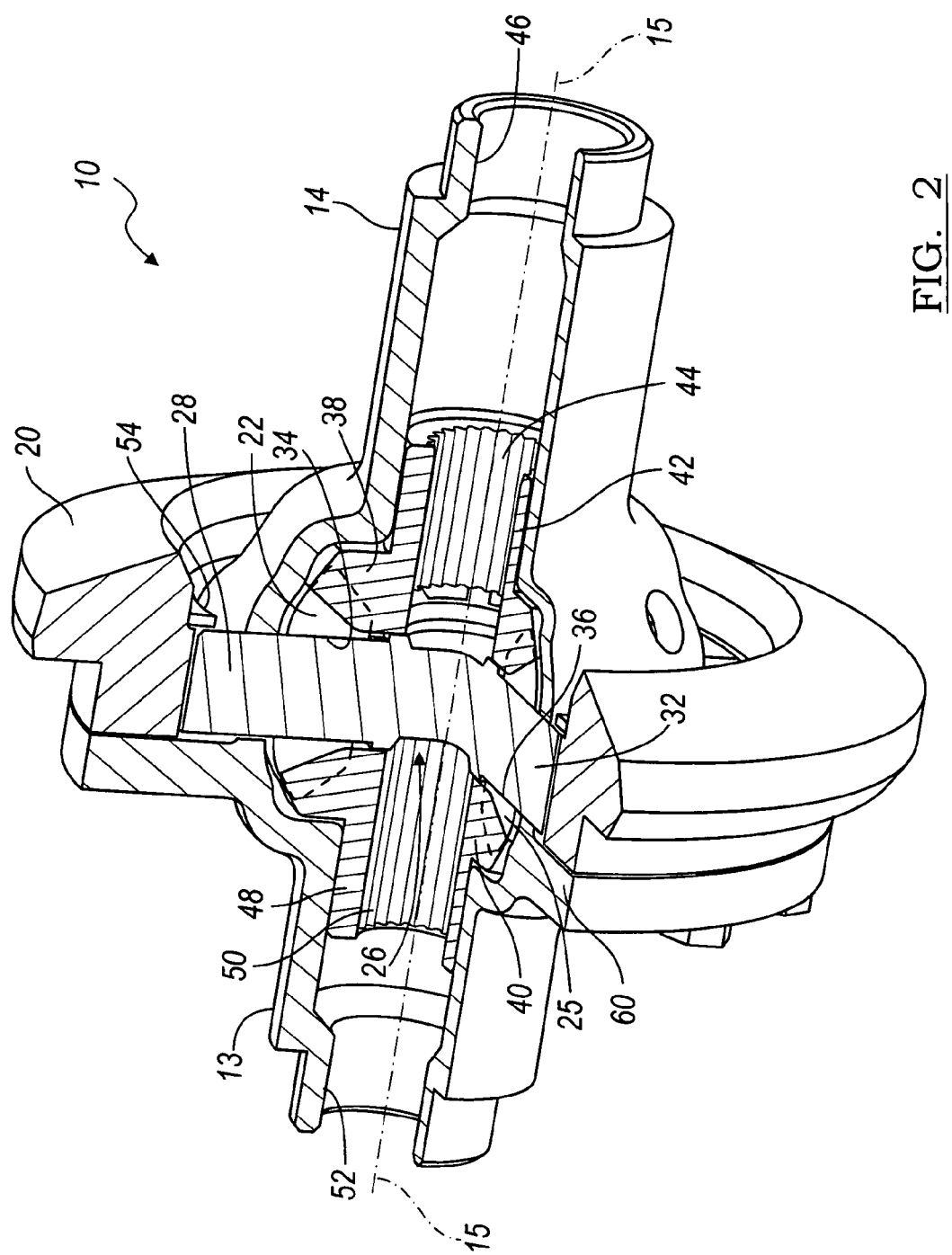
FIG. 2 is perspective cross sectional view showing the case and ring gear of FIG. 1 and components of the differential mechanism assembled in the case.

Referring now to FIGS. 1 and 2, a differential assembly 10 includes a differential case 12 formed in portions 13 and 14 that are secured mutually, the case 12 being supported for rotation about an axis 15, which extends laterally toward the left and right wheels of a driven wheel set of an automotive vehicle. The case 12 is driveably connected to a drive gear 16, which rotates about an axis 17 and is driven from a transmission output (not shown). Axis 17 can be either perpendicular or parallel to axis 15. A pinion 18, secured to drive gear 16, is engaged with a ring gear 20, which is secured to case portion 13 and drives the differential assembly 10 in rotation about axis 15.

The case portions 13, 14 enclose a cavity containing bevel pinions 22-25, each formed with bevel gear teeth and spaced in equal angular increments about axis 15. Each pinion 22-25 is secured to case 12 by a spider 26, which includes a differential pin 28, fitted into two holes in case 12, and two pins 30, 32, directed normal to pin 28. Each of pins 30, 32 is fitted into a hole in case 12 and into a spherical depression in pin 28. Pin 28 passes though a hole 34 in bevel pinion 22 and a similar hole in pinion 24. Pinions 22, 24 are located at mutually diametric opposite sides on case 12 and near axially opposite ends of pin 28. Pin 32 passes through a hole 36 through bevel pinion 25, and pin 30 passes a similar hole through bevel pinion 23. As case 12 rotates about axis 15, pinions revolve about axis 15 and rotate about the axes of their respective spider pin 28, 30, and 32.

Two side gears 38, 40, each formed with bevel gear teeth in meshing engagement with the teeth of the pinions 22-25, are located in the cavity of casing 12. Side gear 38 includes an axial surface 42, extending away from the spider 26 and formed on its inner surface with a spline 44, by which it is engaged with an axle shaft (not shown) connected to the right-hand side wheel of the vehicle. The right-hand side axle shaft extends laterally through an opening 46 formed in case portion 14. Similarly, at the left side of the differential assembly 10, side gear 40 includes an axial surface 48, extending away from the spider 26 and formed on its inner surface with a spline 50, by which it is engaged with an axle shaft (not shown) connected to the left-hand side wheel of the vehicle. The left-hand side axle shaft extends laterally through an opening 52 formed in case portion 13.

The case 14 and gear 20 are secured mutually by a weld 54, preferably a laser weld, which extends radially toward axis 15 at a plane where the case 14 and gear 20 are in mutual contact. Weld 54 also extends circumferentially about axis 15. After case portion 14 and gear 20 are interconnected by weld 54, case portion 13 and ring gear 20 are secured mutually by a series of bolts 56, each bolt fitted into a hole 58 on a circle of bolt holes formed in a radial flange 60 on case portion 13.

Figure 8:
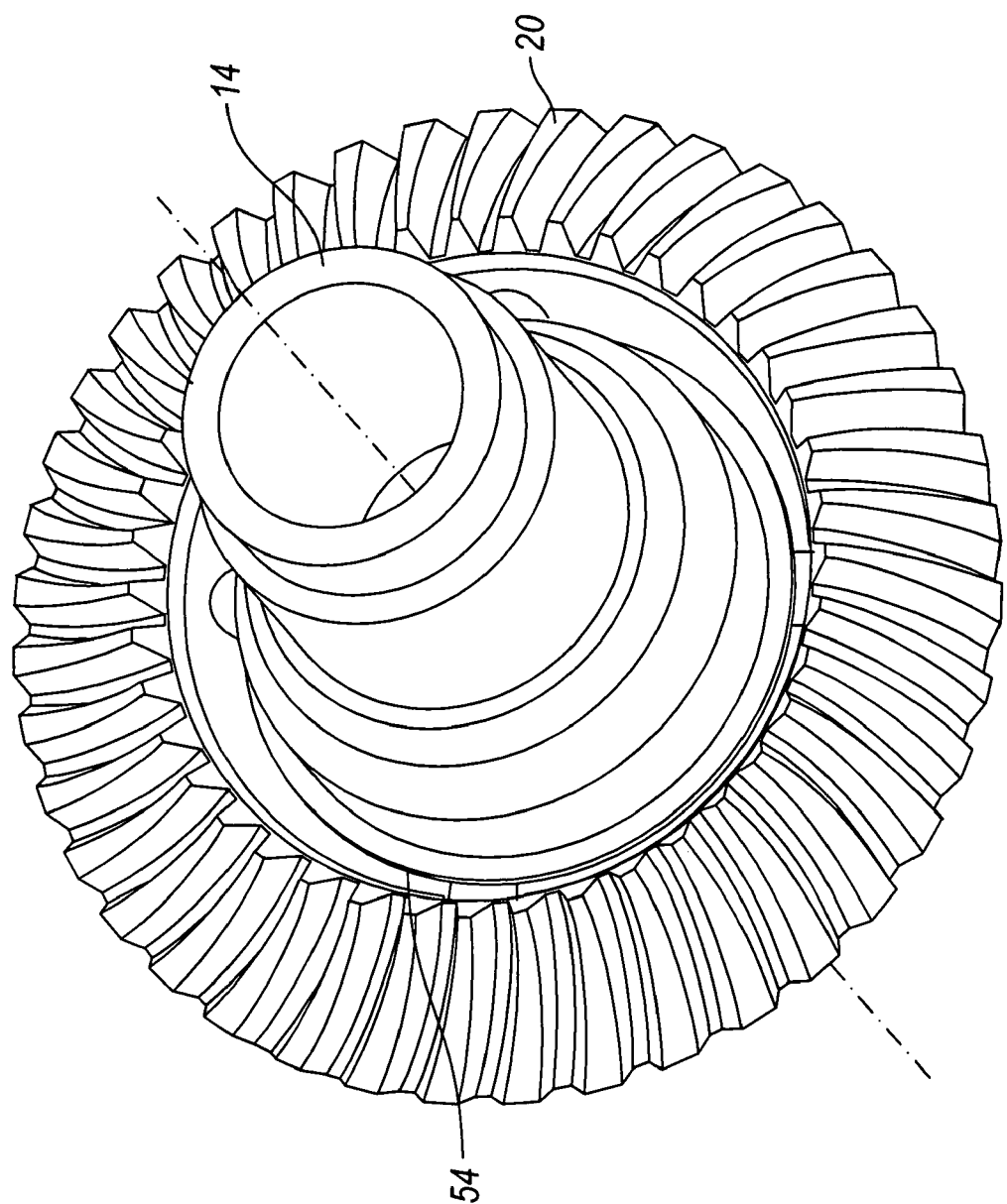
FIG. 8 is a front view of differential case portion showing a weld seam that secured the ring gear.

FIG. 8 is a front view of differential case portion 14 showing the circular laser weld seam 54 welded in the axial direction from the side shown there, by which ring gear 20 is secured to the case portion 14. The intersection between the ring gear bore and the case outside diameters in nominally a line-to-line fit, with either a slight interference or a slight slip fit being acceptable. The interface between ring gear 20 and case portion 14 is welded, preferably by laser welding, in the axial direction.

Figure 6:
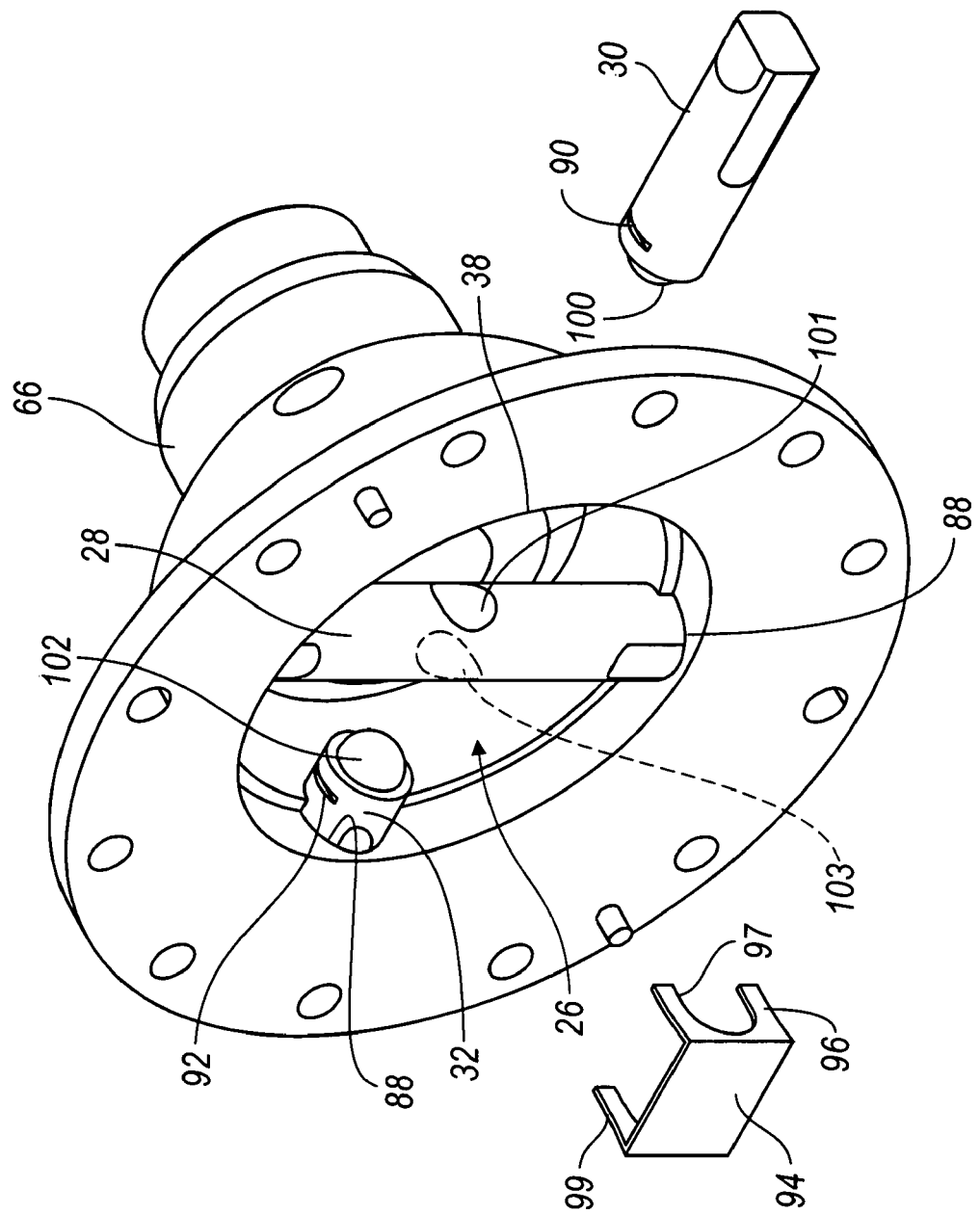
FIG. 6 is a perspective view of the interior of a differential case portion showing spider pins and a retention clip.

Case portion 13 includes an axial protrusion 80, which contacts an annular rim 82 on case portion 14, when the parts are assembled. The axial protrusion 80 is formed with a series of arcuate recesses 84, spaced angularly about axis 15. Each recess 84 partially surrounds a respective spider pin 28, 30, 32 (as shown in FIG. 6) and is aligned with a spider pin hole portion 86 formed in case portion 14. Each recess 84 and hole portion 86 complete a circular or slotted hole 88, which contains a spider pin 28, 30, 32 when the case is assembled.

Figure 3:
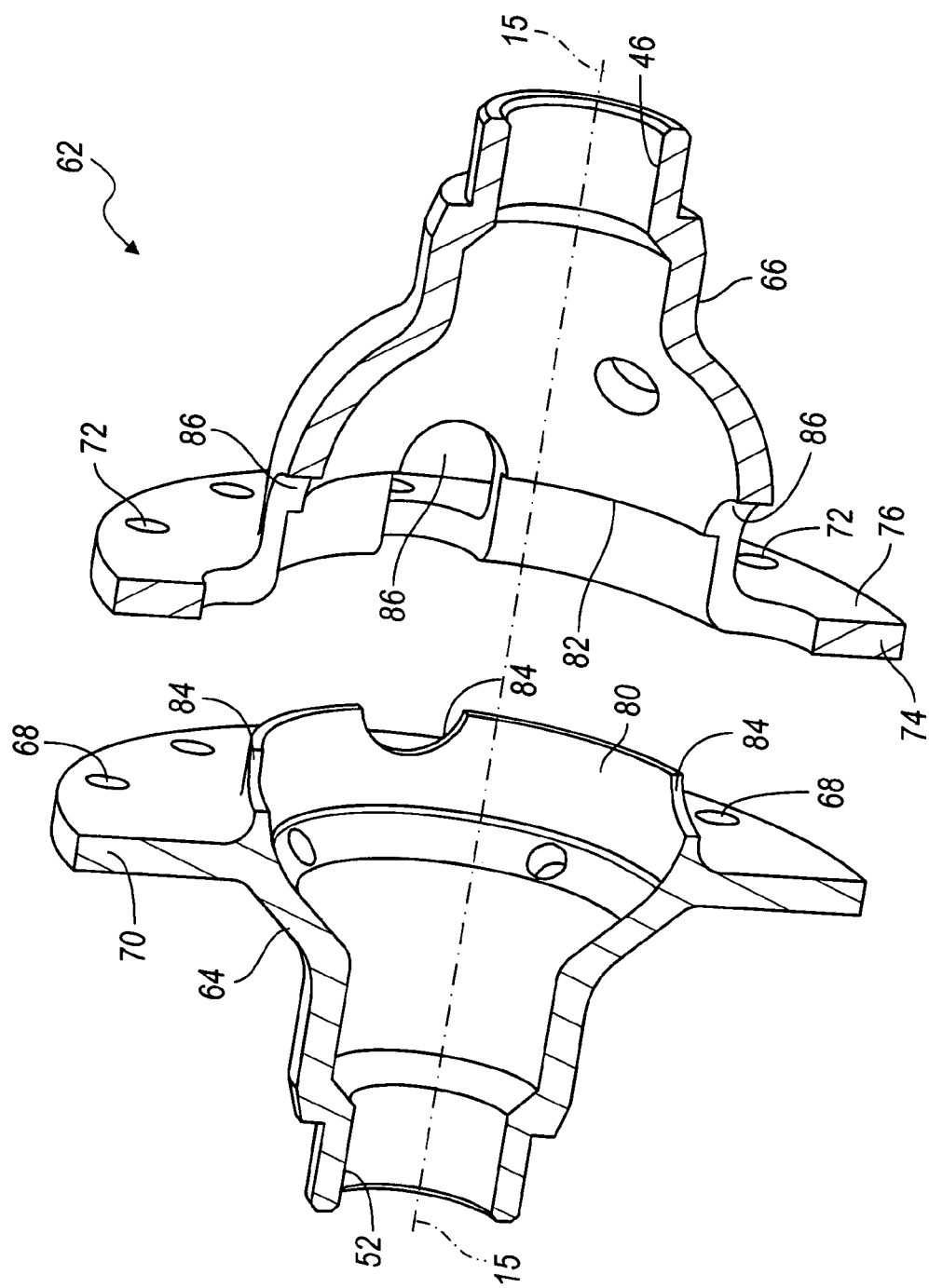
FIG. 3 is a perspective cross section of a bolted differential case formed in portions, shown separated and axially spaced.
Figure 4:
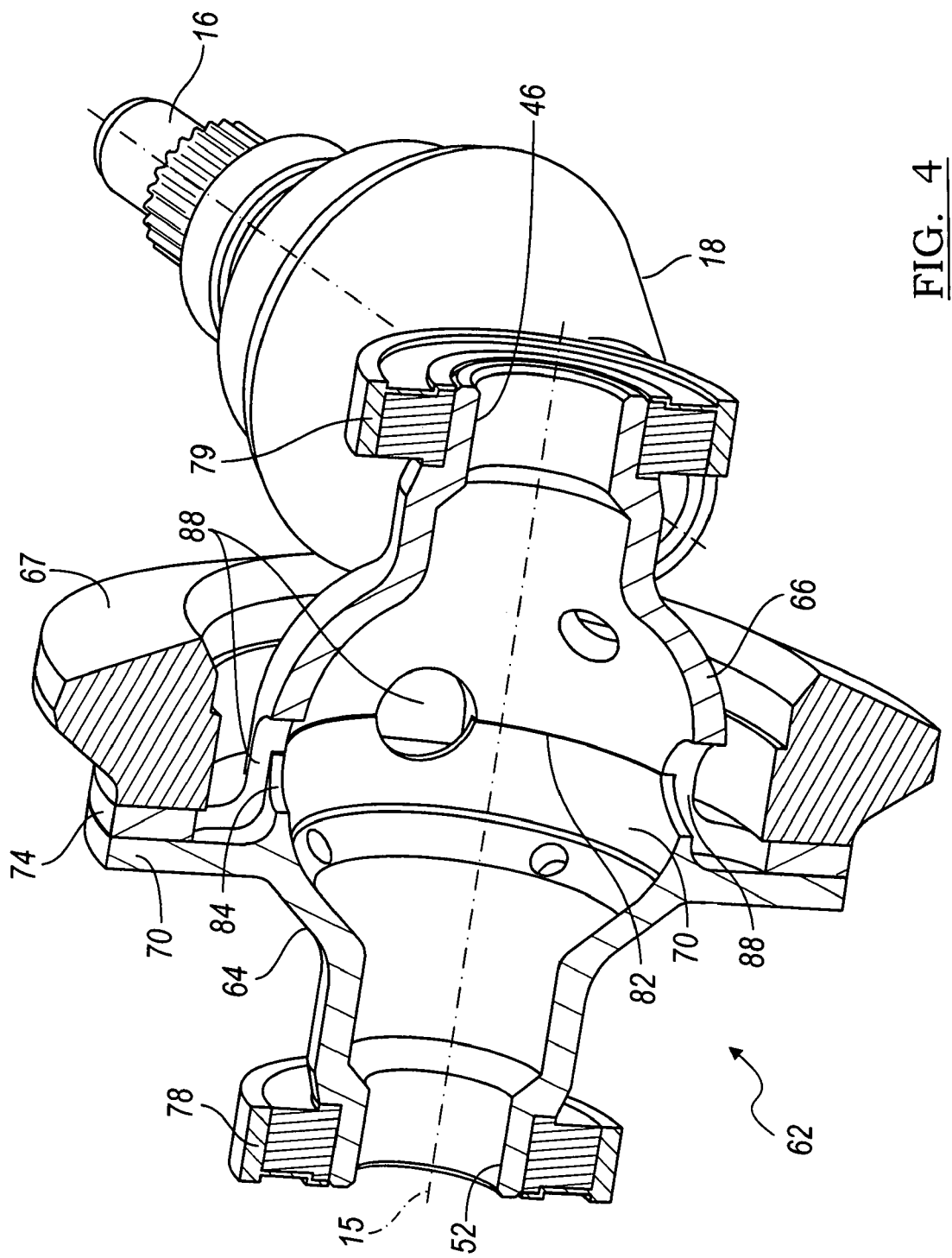
FIG. 4 is partial cross sectional showing the differential case and ring gear of FIG. 3 in their assembled positions.

FIGS. 3 and 4 illustrate an alternative embodiment of a differential assembly 62, in which two differential case portions 64, 66 are secured mutually and to a ring gear 67 by a series of bolts, each bolt being fitted into a hole 68 located on a circle of bolt holes formed in a radial flange 70 on case portion 64 and a hole 72 located on a circle of bolt holes formed in a radial flange 74 and aligned with a hole 68 on case portion 66. Flanges 70, 74 are in mutual contact, and the ring gear contacts the face 76 of flange 74.

FIG. 4 shows bearings 78, 79 fitted over the outer surfaces of case portions 64, 66 and axially spaced mutually along axis 15 for supporting the case 62, and ring gear 67 in rotation about axis 15.

Case portion 64 includes an annular, axial-extending protrusion 80, which contacts an annular rim 82 on case portion 66, when the parts are assembled, as shown in FIG. 4. The axial protrusion 80 is formed with a series of arcuate recesses 84, spaced angularly about axis 15. Each recess 84 partially surrounds its respective spider pin 28, 30, 32 and is aligned with a spider pin hole portion 86 formed in case portion 66. Each recess 84 and hole portion 86 complete a circular hole 88, which contains a spider pin 28, 30, 32 when the case is assembled as shown in FIG. 4.

Figure 5:
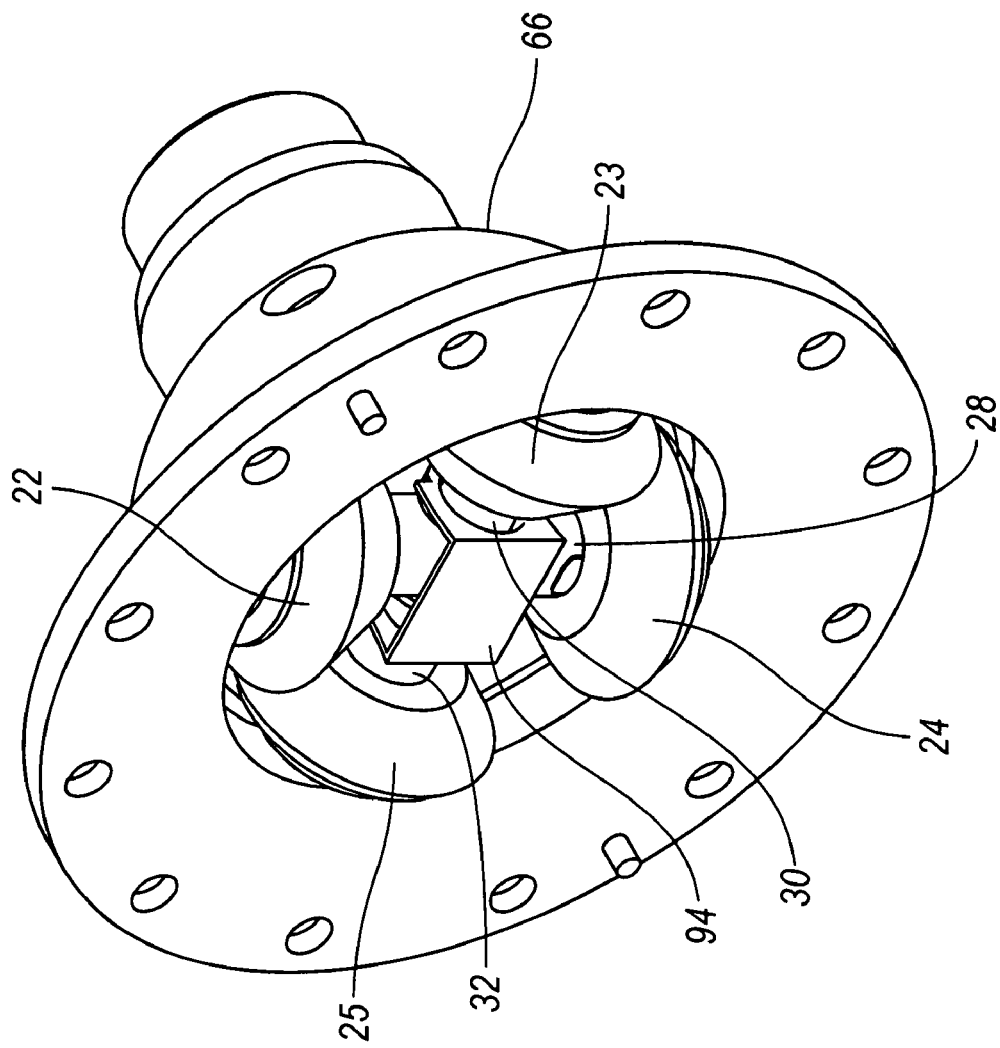
FIG. 5 is a perspective view of the interior of a differential case portion showing bevel pinions assembled on spider pins.

FIG. 5 illustrates the pinions 22-25 supported on a case portion 14, 66 for rotation about the spider pins 28, 30, 32. FIG. 6 shows parallel slots 90 formed at diametrically opposite sides of spider pin 30, and parallel slots 92 formed at diametrically opposite sides of spider pin 32. A clip 94 includes legs 96, 97, each of which engages a slot 90 on spider pin 30, and legs 98, 99, each of which is similar respectively to a leg 96, 97 and engages a slot 92 on spider pin 32. Upon assembly, clip 94 retains spider pins 30, 32 in a correct position in their respective holes 88, such that a protrusion 100 at the inner end of pin 30 is retained in and supported on a hole 101 formed in spider pin 28, and a protrusion 102 at the inner end of pin 32 is retained in and supported on hole 103, which is aligned with hole 101.

Figure 7:
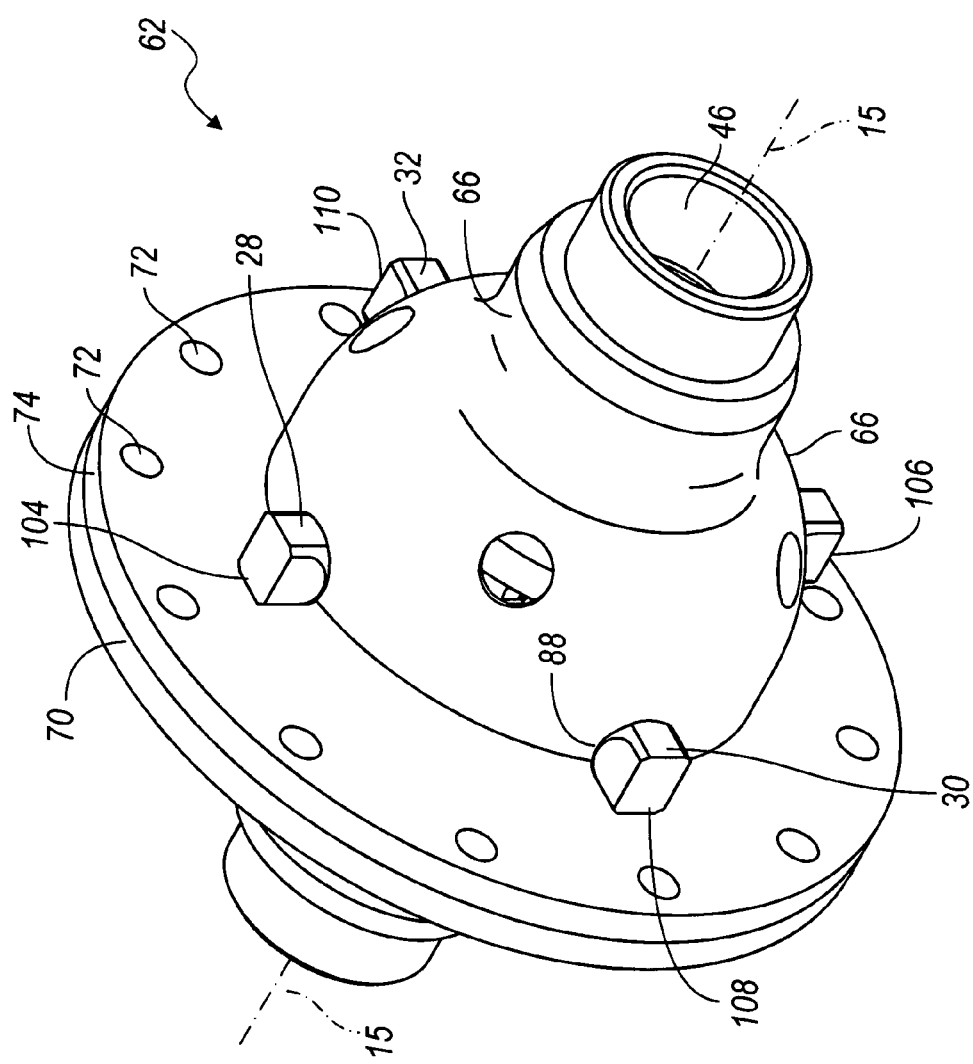
FIG. 7 is a perspective view of the exterior of a differential case portion showing the ends of the spider pins extending through the case.

FIG. 7 shows the ends 104, 106 of spider pin 28 extending through holes 88, the end 108 of spider pin 30 extending through a hole 88, and the end 110 of spider pin 32 extending through a hole 88. During assembly of case 66, ring gear 67 is located radially outboard of the spider pin ends 104, 106, 108, 110 and is bolted to flanges 70, 74.

Figure 9:
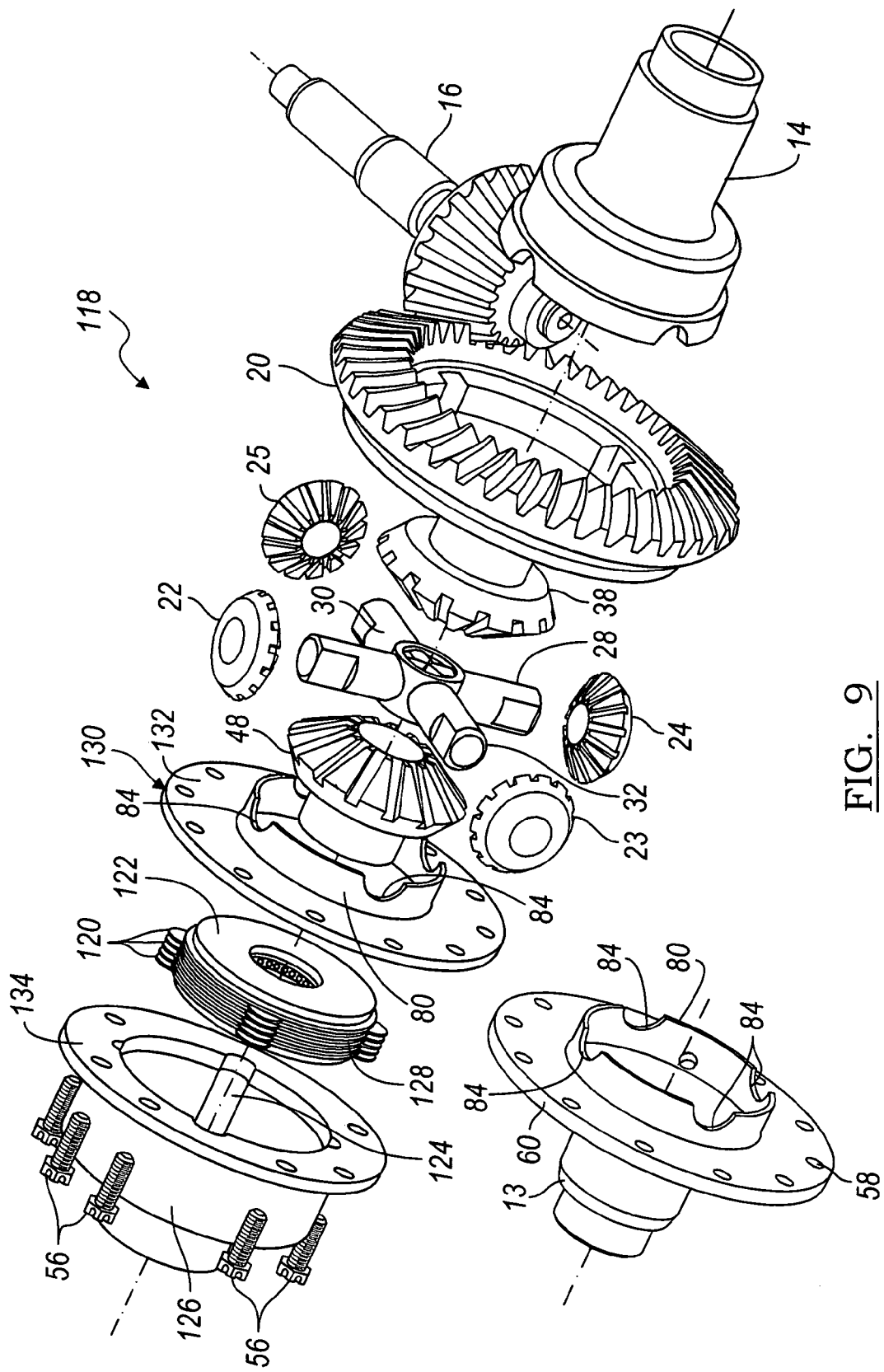
FIG. 9 is a perspective view showing the components of a limited slip differential in spaced-apart relation.

In a second embodiment, the limited slip differential (LSD) 118 shown in FIGS. 9 and 10, angularly spaced radial tabs 120 on the clutch plates 122 are aligned with and located in angularly spaced grooves 124 formed in the LSD case 126, thereby preventing rotation of the clutch plates. Alternatively, many shallower tabs 120 and grooves 124 or splines could be used for this purpose. If the depth of the locking feature is much less than the case wall thickness, then the grooves or splines can be machined into a mandrel, and easily flow formed into the inside diameter of the LSD case 126. Friction discs 128, interleaved between successive clutch plates 122, are secured to the side gear 48. When the friction discs 128 and clutch plates 122 are forced axially into mutual frictional contact by side gear separating forces, a drive connection between side gear 48 and LSD case 126 is either fully closed or partially closed depending on the degree of the slip that occurs between the side gear and case.

A bridge piece 130, formed with the annular, axial-extending protrusion 80, includes a flange 132, which is secured by bolts 56 to the flange 134 of case 126 and to the ring gear 20. An alternate construction eliminates flange 132 and presses the bridge piece 130 into case 14, 66.

FIG. 10A shows the first embodiment, the open differential 10 of FIGS. 1-4, whose case portion 13 includes the annular, axial-extending protrusion 80.

FIG. 10 B shows the second embodiment, the limited slip differential (LSD) 118 shown in FIG. 9.

FIG. 10 C shows an electronic locking differential 135 including a case portion 136, an electromagnetic coil of wire 138 secure to case portion 136, a side gear 140 formed with axial facing dog clutch teeth 142, and an actuating ring 144 secured to case portion 136. Ring 144 moves axially into engagement with the clutch teeth 142 when coil is energized by electric current, thereby securing side gear 140 to case portion 136. Ring 144 moves axially out of engagement with the clutch teeth 142 when the electromagnet 138 is deenergized, thereby allowing side gear 140 to rotate differentially. The case portion 136 is formed with a flange 146, which is secured by bolts 56 to the ring gear 20.

FIG. 10D shows the common case portion 14 attached to the ring gear by welding. If serviceability is not an issue, the three interchangeable case portions, case 13 of the open differential 10, case 126 of the limited slip differential 118 and case 136 of the locking differential, can also be secured to ring gear 20 by welding.

FIG. 11 shows a cross sectional view of a fourth embodiment 150, in which the ring gear 20 and the common case portion 14 are consolidated into a single precision forging 152. The second case portion used with the consolidated forging 152 can be case portion 13 of the open differential 10, case portion 126 of the limited slip differential 118 and case portion 136 of the locking differential, each of which is secured to the bowl shaped region of the ring gear 20. The forging 152 requires machining on radial inner surfaces.

Figure 12:
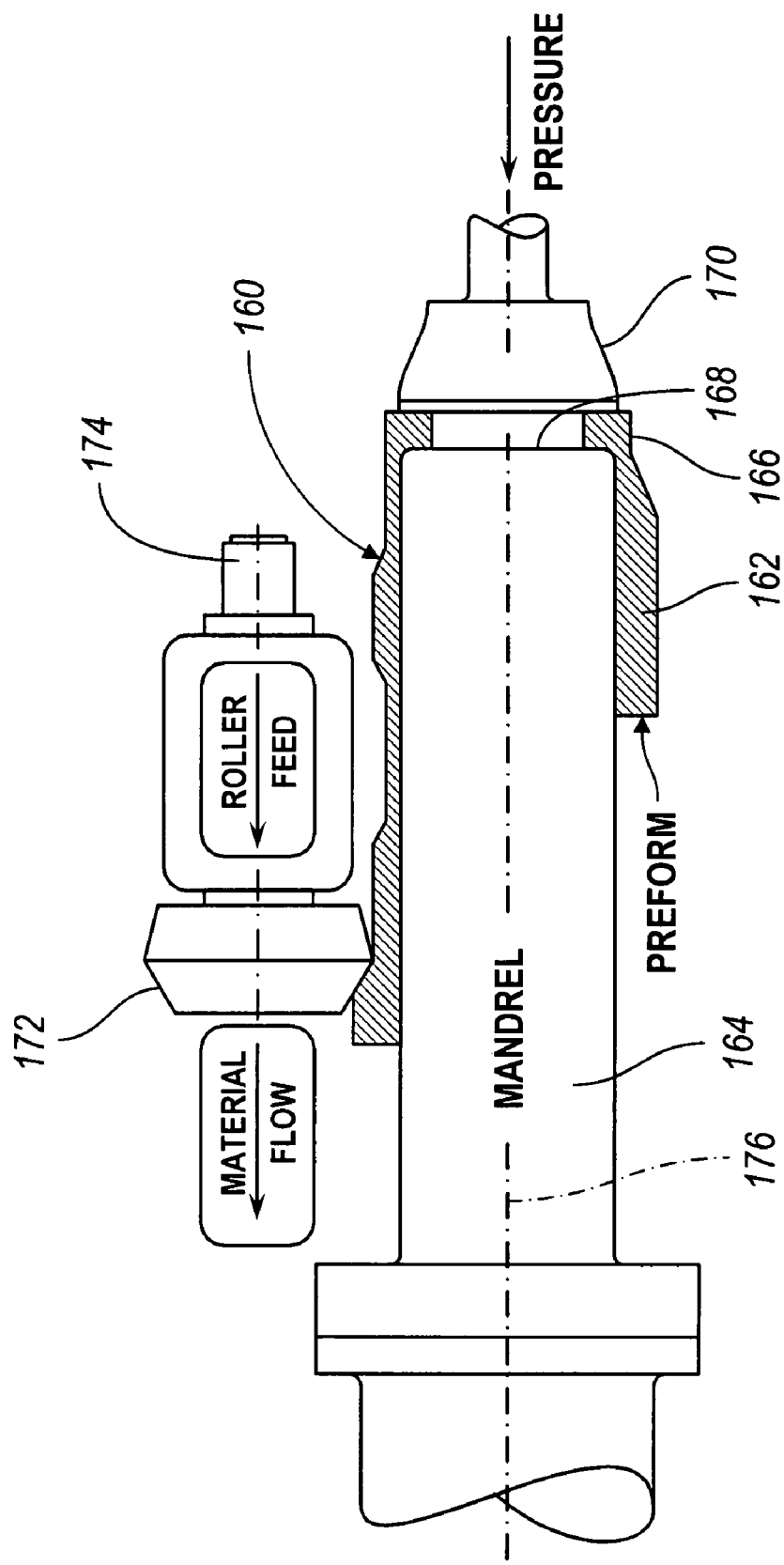
FIG. 12 shows schematically a workpiece being formed by flow forming.

FIG. 12 shows schematically a tubular workpiece 160 of metal, such as steel, being formed by a flow forming process. A preformed tube 162, fitted over a mandrel 164, is held at one end 166 between an end face 168 of the mandrel and a tail stock 170, which is forced axially into contact with the workpiece to hold the workpiece in position on the mandrel. A roller 172 driven in rotation about axis 174 moves axially along mandrel 164 and radially with respect to the axis 176 of the mandrel. The material of workpiece 160 flows axially along the mandrel as the roller moves along the mandrel, thereby forming the thickness and contour of the outer surfaces of the workpiece 160. The inner contour and wall thickness of workpiece 160 varies along the length of the workpiece also in response to changes in the outer contour of the mandrel 164.

A steel workpiece 160 is significantly strengthened by work hardening that occurs due to the flow forming process. For example, a workpiece perform 162 of AISI 1006 steel with fine, equiaxed grains and a very low inclusion level, can be cold worked from an initial hardness of 115 HB, to a hardness of 225 HB.

FIGS. 13A and 13B show a disc preform 162, a cylindrical mandrel 164, a plate 180 supporting the preform, and a cylindrical roller 172 being forced radially toward axis 176, contacting the perform and forming a hollow cylindrical workpiece hub 182 located at a first axial side of the disc 162. FIG. 13C illustrates a second roller 184 being used to wrap the hub 182 tighter onto mandrel 164, thereby improving the surface finish, dimensional accuracy and repeatability of hub 182.

FIGS. 14A and 14B show a second mandrel 186 and a third roller tool 188 being used to split disc 162 and to form the inner and outer contour and wall thickness of a portion 190 of the workpiece as the roller is forces radially toward axis 176. FIG. 14C illustrates roller 188 being used to wrap the portion 190 tighter onto mandrel 186, thereby improving the surface finish, dimensional accuracy and repeatability of hub 180.

The process steps of FIGS. 13A, 13B, 14A and 14B produce lower contact stress at the workpiece surface during the process than true flow forming, because of the increased contact area between the tool rollers and the workpiece, thus reducing accuracy and finish of the workpiece surfaces. The process steps of FIGS. 13C and 14C show true flow forming being used to produce the desired accuracy and finish of the workpiece.

Figure 15:
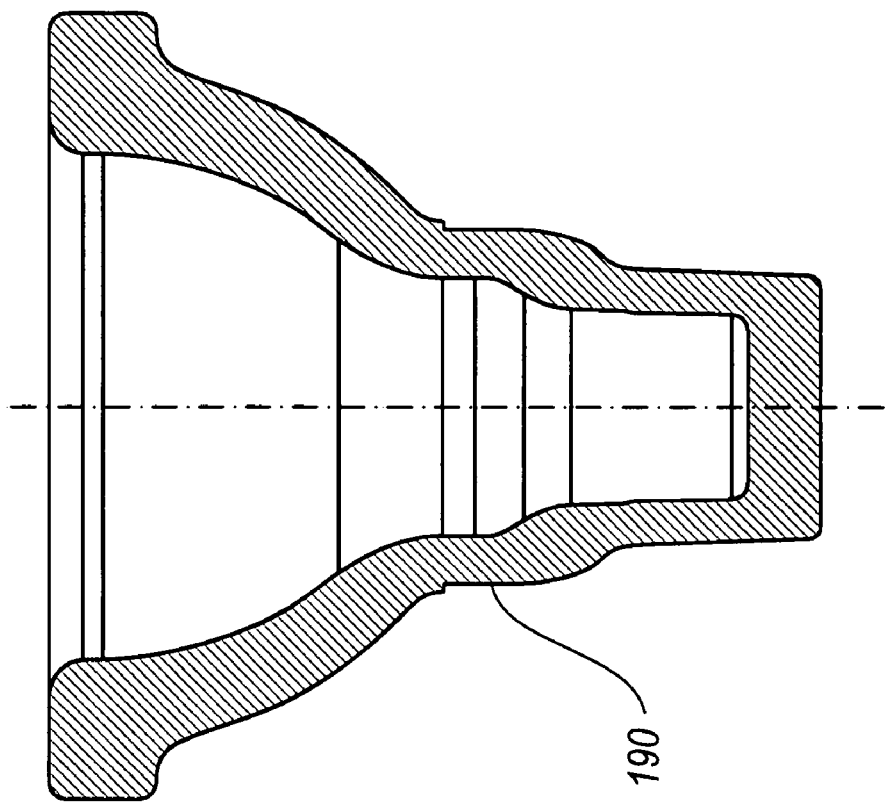
FIG. 15 is a cross section taken at a diametric plane through a forged perform having a wall thickness that varies before flow forming.

FIG. 15 shows a forged preform 190 having a wall thickness that varies before flow forming. Preform 190 will be formed by subsequent flow forming into a differential case portion 13, 14, 126, 136, thereby allowing flow forming to be more effective and requiring less forming time.

Figure 16C:
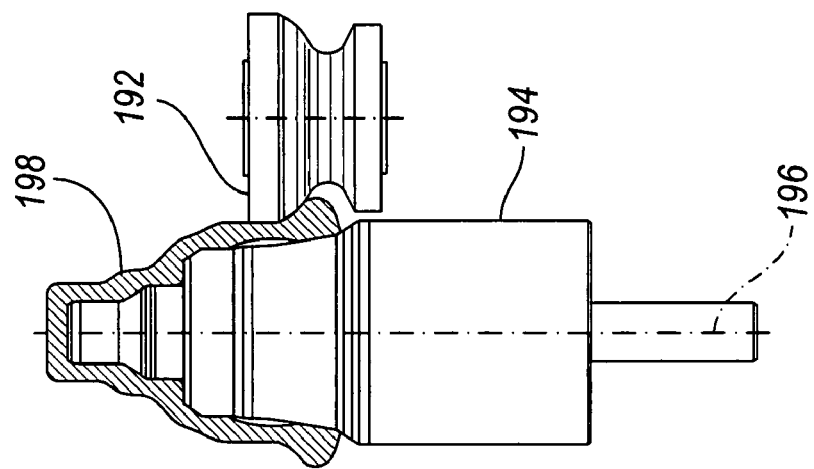
FIGS. 16A, 16B and 16C are cross sections taken at a diametric plane through a workpiece illustrating successive process steps for flow forming a differential case portion.
Figure 16B:
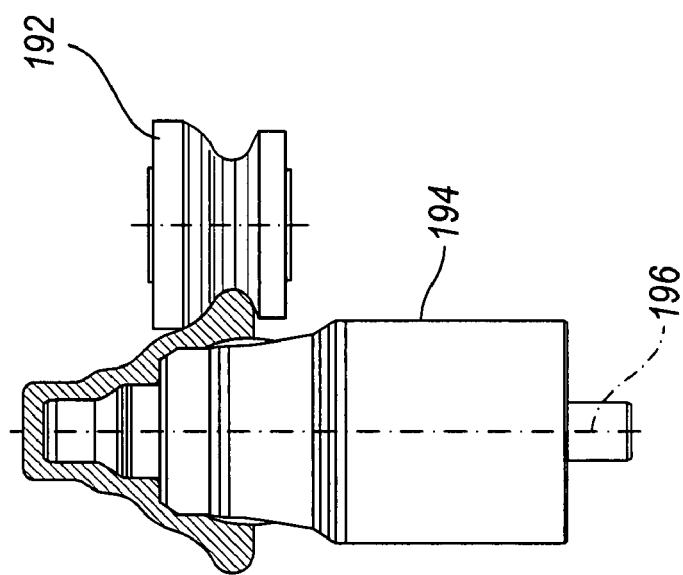
Figure 16A:
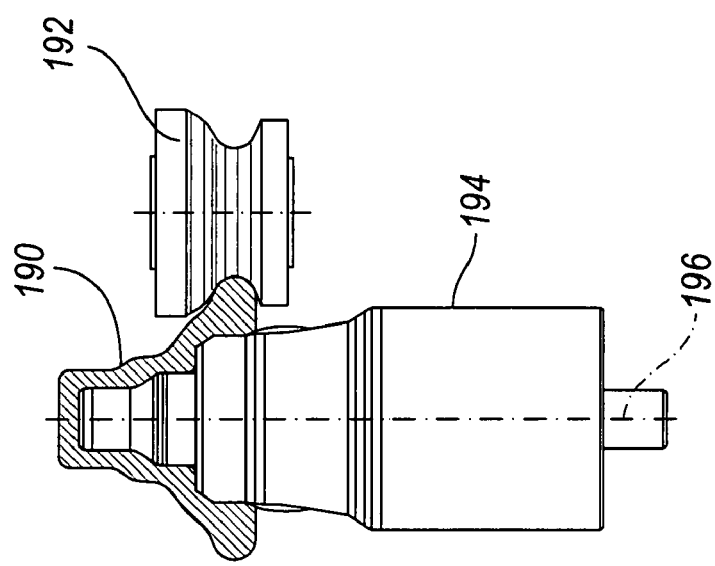

FIG. 16A-16C show successive steps for flow forming the forged preform 190 of FIG. 15 by moving various tool rollers 192 axially along a mandrel 194 and radially with respect to axis 196. A full anneal or some other heat treating process to increase cold formability may be required after the step shown in FIG. 16C.

Figure 17A:
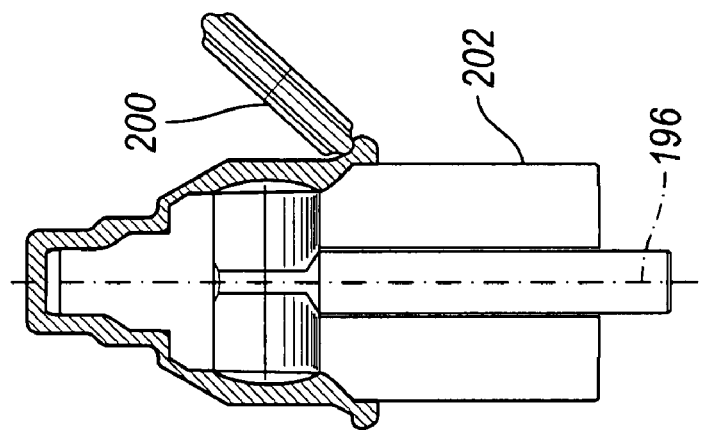
FIGS. 17A, 17B and 17C are cross sections taken at a diametric plane through the workpiece illustrating later, successive process steps for flow forming a differential case portion.
Figure 17B:
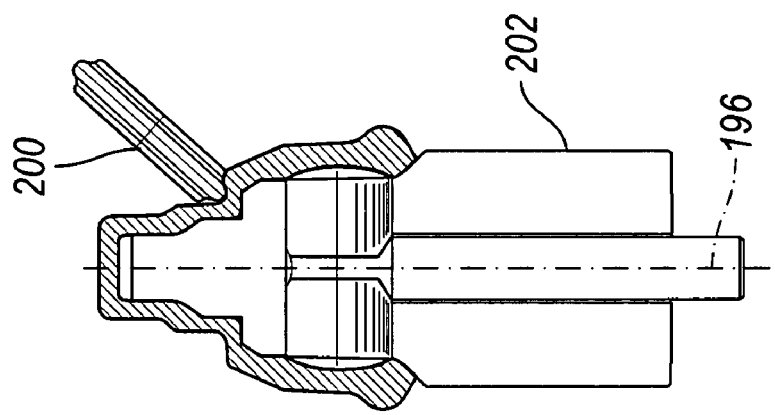
Figure 17C:
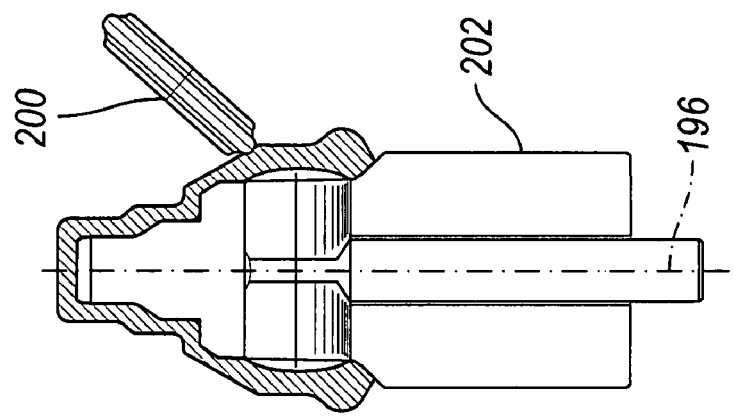

FIG. 17A-17C show later, successive steps for flow forming the workpiece 198 of FIG. 16C by moving various tool rollers 200 axially along another mandrel 202 and radially with respect to axis 196 to achieve the desired inside tolerances and inside surface finish of a differential case portion 13, 14, 126, 136.

In accordance with the provisions of the patent statutes, the preferred embodiment has been described. However, it should be noted that the alternate embodiments can be practiced otherwise than as specifically illustrated and described.

What is claimed is:

1. A differential assembly, comprising:
   a first case portion;
   a second case portion secured to the first case portion and supported for rotation about an axis;
   a first spider pin located at an axial position and secured to the second case portion;
   second and third separate spider pins supported on the first spider pin and the second case portion;
   a ring gear secured to the first case portion located at said axial position;
   a clip including first legs engaging slots in the second spider pin, and second legs engaging slots in the third spider pin.

2. The assembly of claim 1, wherein the first case portion includes a flange formed with bolt holes, the assembly further comprising:

bolts, each bolt extending through one of the bolt holes and engaging the ring gear; and a weld connecting the first case portion to the second case portion.

3. The assembly of claim 1 wherein:

the first case portion includes a flange formed with first bolt holes;

the second case portion includes a second flange formed with second bolt holes, each second bolt hole aligned with one of the first bolt holes, the assembly further comprising:

bolts, each bolt extending through one of the first bolt holes and one of the second bolt holes, engaged with the ring gear, and mutually connecting the first flange, the second flange and the ring gear.

4. The assembly of claim 1, wherein:

the first case portion includes multiple angularly spaced first recesses;

the second case portion includes multiple angularly spaced second recesses, each second recess being aligned with a first recess, each of the first recesses and one of the second recesses forming a hole, into which the first spider pin is filled.

5. The assembly of claim 1, wherein the first spider pin includes an outer surface that is substantially perpendicular to the first axis, the assembly further comprising:

bevel pinions, each pinion supported on the first spider pin for rotation about the outer surface of the first spider pin;

a first side bevel gear in meshing engagement with the bevel pinions; and a second side bevel gear in meshing engagement with the bevel pinions.

6. The assembly of claim 1, wherein:

the second spider pin is axially aligned with the first spider pin and angularly spaced from the first spider pin;

the third spider pin is axially aligned with the first spider pin and angularly spaced from the first spider pin and the second spider pin.

7. The assembly of claim 1, wherein:

the second spider pin is axially aligned with the first spider pin, perpendicular to said axis and to the first spider pin; and further comprising:

bevel pinions including first and second bevel pinions supported for rotation on the first spider pin, and third and fourth pinions supported for rotation on the second spider pin;

a first side bevel gear in meshing engagement with the first, second, third and fourth bevel pinions; and a second side bevel gear in meshing engagement with the first, second, third and fourth bevel pinions.

8. The assembly of claim 1, wherein:

the clip is in the form of a channel including a web substantially aligned with the first spider pin, first legs located at a first end of the, and second legs located at a end of the web opposite the first end.

9. The assembly of claim 1, wherein:

the first spider pin is formed with first and second holes, the second spider pin engages and is supported on the first spider pin at the first hole, and the third spider pin engages and is supported on the first spider pin at the second hole.

10. A differential assembly, comprising:

a first case portion;

a second case portion secured to the first case portion and supported for rotation about an axis;

a first spider pin located at an axial position and secured to the second case portion;

second and third separate spider pins, mutually aligned at said axial position, each pin fitted in a hole formed on the first spider pin, and supported on the first spider pin and the second case portion;

a ring gear secured to at least one of the first case portion and the second case portion;

a clip including first legs engaging slots in the second spider pin, and second legs engaging slots in the third spider pin.

11. The assembly of claim 10, wherein the first case portion includes a flange formed with bolt holes, the assembly further comprising:

bolts, each bolt extending through one of the bolt holes and engaging the ring gear; and a weld connecting the first case portion to the second case portion.

12. The assembly of claim 10 wherein:

the first case portion includes a flange formed with first bolt holes;

the second case portion includes a second flange formed with second bolt holes, each second bolt hole aligned with one of the first bolt holes, the assembly further comprising:

bolts, each bolt extending through one of the first bolt holes and one of the second bolt holes, engaged with the ring gear, and mutually connecting the first flange, the second flange and the ring gear.

13. The assembly of claim 10, wherein the first spider pin includes a first outer surface that is substantially perpendicular to the first axis, the second spider pinion includes a second surface a second outer surface that is substantially perpendicular to the first axis, and the third spider pin includes a third outer surface, the assembly further comprising:

bevel pinions including first and second bevel pinions supported for rotation on the first outer surface, and third and fourth pinions supported for rotation on the second and third outer surfaces, respectively;

a first side bevel gear in meshing engagement with the first, second, third and fourth bevel pinions; and a second side bevel gear in meshing engagement with the first, second, third and fourth bevel pinions.

14. The assembly of claim 10, wherein:

the first case portion is formed with first, second, third and fourth recesses angularly spaced about the first axis;

the second case portion is formed with fifth, sixth, seventh and eighth fourth recesses angularly spaced about the first axis, the first recess and the fifth recess being mutually aligned and forming a first hole pair, the second recess and the sixth recess being mutually aligned and forming a second hole pair that is radially aligned with the first hole pair, the third recess and the seventh recess being mutually aligned and forming a third hole pair, the fourth recess and the eight recess being mutually aligned and forming a fourth hole pair that is radially aligned with the third hole pair, the first spider pin being filled into the first hole pair and the second hole pair, the second spider pin being filled into the third hole pair and the fourth hole pair.

15. The assembly of claim 10 wherein:

the clip is in the form of a channel including a web substantially aligned with the first spider pin, first legs located at a first end of the web, and second legs located at a end of the web opposite the first end.

* * * * *